(No Model.) 2 Sheets—Sheet 1.
L. GODDU.
CAR TRUCK.
No. 381,620. Patented Apr. 24, 1888.
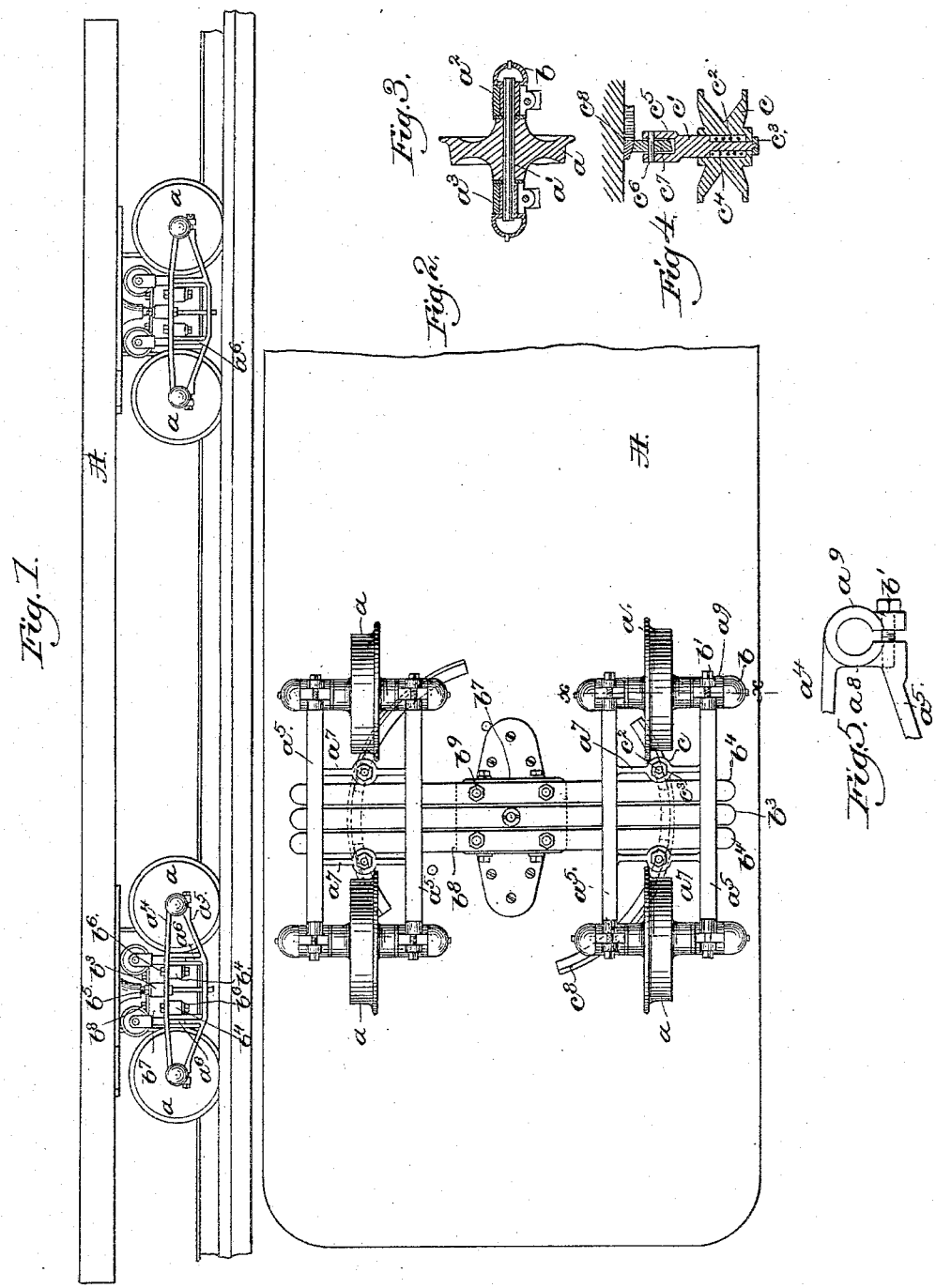
Witnesses.
Fred L. Emery
John F. C. Prinkert
Inventor:
Louis Goddu.
by Crosby & Gregory
Attys.

(No Model.) 2 Sheets—Sheet 2.
L. GODDU.
CAR TRUCK.
No. 381,620. Patented Apr. 24, 1888.
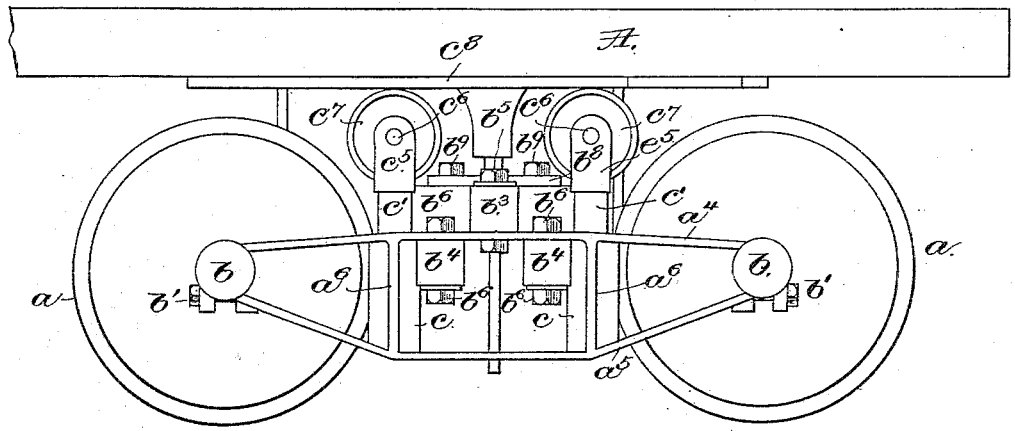
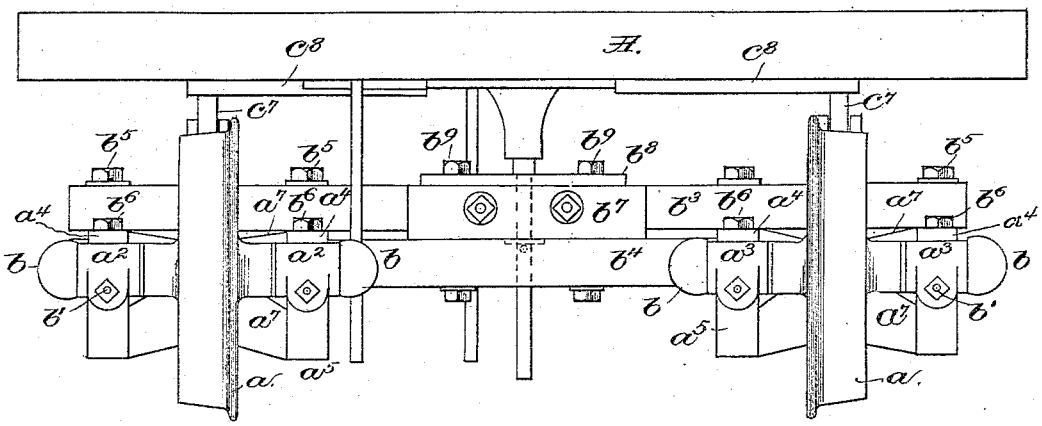
Witnesses.
Howard F. Eaton
John F. C. Prindert
Inventor.
Louis Goddu
by Crosby & Gregory
Attys.

UNITED STATES PATENT OFFICE.

LOUIS GODDU, OF WINCHESTER, MASSACHUSETTS.

CAR-TRUCK.

SPECIFICATION forming part of Letters Patent No. 381,620, dated April 24, 1888.

Application filed May 21, 1887. Serial No. 238,960. (No model.)

*To all whom it may concern:*

Be it known that I, LOUIS GODDU, of Winchester, in the county of Middlesex and State of Massachusetts, have invented an Improvement in Car-Trucks, of which the following description, in connection with the accompanying drawings, is a specification, like letters on the drawings representing like parts.

This invention relates to car-trucks, and has for its object to provide a strong and durable truck which is adapted to be used on cars running over roads having sharp curves, my improved truck being especially designed to be employed on cars used on the Brooklyn bridge system, (shown and described in my application, Serial No. 219,928, filed November, 26, 1886.)

In car-trucks as now constructed and known to me a single axle extended across the track supports a wheel at each end—that is, a wheel resting upon each rail of the track.

In car-trucks constructed as referred to, when running around a curve of the track, the outer wheel travels in an arc of a circle having a greater radius than the arc of the circle in which the inner wheel travels. It would follow from this that the outer wheel should necessarily travel faster than the inner wheel; but as both wheels are rigidly fastened to the same axle the inner wheel would ordinarily slip backward, or it might cause the outer wheel to slip forward. In either case the bearing friction between the wheels and rails of the track is very great, and produces a great friction between the flanges of the wheels and the rails, and is proportional to the load carried.

The axle connecting the wheels in the truck referred to is subjected to a twisting strain as the said truck is going round curves, the said twisting strain or effect on the axle being proportional to the friction between the flanges of the wheels and the rails, and the friction between the flanges of the wheels and the rails being very great tends to spread apart the rails of the track, thus giving rise to accidents.

My invention has for one of its objects to obviate this increased friction between the flanges and the rails, and also to thus obviate the twisting effect on the car-axle, and I accomplish this by providing each car-wheel with an independent axle, which is supported in bearings each side of the said wheel, the said bearings being supported in boxes preferably forming an integral part of a wheel-supporting frame constituting part of the car-truck.

The wheel-supporting frame referred to will preferably be cast in one piece, and will consist of two sets or pairs of tie and arch bars, preferably cast integral, the said tie and arch bars being strengthened by cross bars or braces.

The wheel-supporting frames, there being two to each car-truck, are joined, as shown, by a suitable rigid bolster and transoms attached to and supported by the said frame, the said bolster and transoms sustaining a center plate for the king-bolt.

Another feature of my invention consists in providing a somewhat yielding support for the car-body, so that the car may ride easily and smoothly over the road-bed and be substantially unaffected by irregularities in the rails—such as caused by the end of one rail-section being somewhat higher than the end of the adjacent or contiguous rail-section. This feature of my invention I accomplish as herein shown by spring-supported friction or bearing rollers adapted to travel on a flat rail or track secured to the under side of the car-body.

Other features of my invention will be pointed out in the claims at the end of this specification.

Figure 1 shows a sufficient portion of a car provided with my improved truck to enable my invention to be understood. Fig. 2 is an inverted view of Fig. 1—that is, a view looking up from below the car; Fig. 3, a detail in section and elevation through one of the wheels of the truck on line $x$ $x$, Fig. 2, the axle of the wheel being in elevation; Fig. 4, a sectional detail to be referred to; Fig. 5, a detail of part of the wheel-supporting frame. Fig. 6 is a side elevation, on a larger scale, of one truck; and Fig. 7 is a rear end elevation on the same scale as Fig. 6.

Referring to the drawings, A represents the bottom or floor of a car of any desired construction, but which in the present instance may be the floor of a car employed on the Brooklyn bridge system referred to, the said car being supported upon my improved trucks constructed as will be described.

The wheels $a$, to run on each rail of the track, are mounted on axles $a'$, having their journals supported in bearings $a^2$, sustained by boxes $a^3$, secured to or forming part of a wheel-supporting frame.

The wheel-supporting frame referred to is preferably cast in one piece and is composed of two arch-bars, $a^4$, and two tie-bars, $a^5$, an arch and tie bar being united by bars $a^6$, (see Figs. 1 and 6,) and the two arch-bars and the two tie-bars being joined by cross braces or bars $a^7$, the bars $a^6$ and cross braces or bars $a^7$ being shown in the present instance as one piece or bar, the said arch and tie bars being also shown as united near their ends by a bar, $a^8$, (see Fig. 5,) the bar $a^8$ forming, with an extension or arm, $a^9$, of the arch-bar, the journal-box $a^3$. The arm $a^9$ of the arch-bar $a^4$ is separated from the bar $a^8$ by a space of sufficient width to permit the journal of the wheel axle $a'$ to be passed into the box $a^3$, the journal-bearing $a^2$ being then slipped over the said journal.

The journal-bearing $a^2$ is herein shown as provided with a cup or reservoir, $b$, (see Fig. 3,) to contain oil or other lubricant by which to lubricate the said journal-bearing, the said cup or reservoir being shown as integral with the said journal-bearing.

The journal-bearings $a^2$ are secured in their boxes, as shown, by screws $b'$.

The wheel-supporting frames running on opposite rails of the track are connected, as shown, by the rigid bolster $b^3$ and transoms $b^4$, the bolster $b^3$, preferably of wood, being supported upon the arch-bars $a^4$, to which the said bolster is herein shown as secured by bolts $b^5$, the transoms $b^4$ being below the said arch-bars and secured thereto by bolts $b^6$.

The rigid bolster $b^3$ and transoms $b^4$ near their longitudinal center support a block, $b^7$, to which the center plate, $b^8$, is secured, (see full lines, Fig. 1, and dotted lines, Fig. 2,) the said block being fastened to the said bolster and transoms, as herein shown, by bolts $b^9$. Each cross brace or bar $a^7$ of each wheel-supporting frame near its center, as herein shown, is enlarged, as at $c$, (see Fig. 4,) and is provided with a socket or opening, into which is extended a rod or spindle, $c'$, the lower end of which is reduced in cross section, as at $c^2$, and extended through the said enlarged portion $c$ of the cross brace or bar $a^7$, where it is provided with a nut, $c^3$, a spring, $c^4$, encircling the reduced portion $c^2$ within the said socket or opening. The spindle or rod $c'$, as shown, is provided with forks $c^5$, supporting a shaft, $c^6$, upon which is mounted a friction or bearing roller, $c^7$, the said roller preferably having its periphery beveled or inclined to ride on an inclined track or rail, $c^8$, attached to the bottom of the car. By making the periphery of the roller $c^7$ beveled or inclined, to co-operate with an inclined track, as described, I diminish to a great degree friction between the said roller and track when the car is going around curves, and also obviate the use of guides for the said roller, which it would be necessary to have on the track $c^8$ if the periphery of the roller were of other shape—that is, if it were flat.

The oil-reservoir $b$ will preferably have an inlet near its center in line with the axle. The inlet referred to may be an opening provided with a screw-cap, $d$, as shown in Fig. 3.

When the car, supported by my improved truck, is carried round a curve, the axle $a'$ of each wheel is rigidly sustained by its wheel-supporting frame and is in no wise subjected to a twisting strain, as in trucks now commonly used. Slight shocks due to unevenness of the rails is taken up, as shown, by spring $c^4$; but instead of this particular form of construction I may employ springs such as now commonly used on passenger-trucks; but I prefer the construction shown, as the friction-rollers $c^7$ give increased steadiness to the truck when going round curves.

I have herein described the wheel-supporting frame as cast in one piece; but I do not desire to limit myself to this construction, as it is evident that the several component parts of the frame may be made in separate pieces and bolted or otherwise united together.

The twisting strain or effect experienced by axles connecting a wheel on each rail, as in car-trucks as now constructed, which strain is due to the unevenness of the rail-sections—that is, one section being somewhat higher than its next contiguous or adjacent section—is not exerted upon the axles of the wheels in my improved truck, but is transferred to the bolster and transoms, which, being preferably of wood, may be subjected to the said twisting strain without detriment to them.

I prefer to employ the form of journal-bearing shown; but instead I may employ other forms, such as now commonly used, they being secured to or supported by the frame in any suitable manner.

I claim—

1. In a car-truck, two wheel-supporting frames, each consisting of arch-bars and tie-bars joined together and adapted to support a wheel and its axle at each end, combined with a bolster uniting the same, each wheel-supporting frame sustaining its wheels independent of the other, substantially as specified.

2. In a car-truck, two wheel-supporting frames consisting of arch-bars and tie-bars joined together and adapted to support a wheel and its axle at each end, and provided each at its opposite ends with journal-boxes, a journal-bearing in said boxes, and a lubricating cup or reservoir attached to each journal-bearing, combined with a bolster uniting the said frames, substantially as described.

3. In a car-truck, a rigid wheel-supporting frame consisting of arch-bars $a^4$ and tie-bars $a^5$, joined together and adapted to support a wheel-axle at each end to obviate twisting strain or effect on the said axles, substantially as described.

4. In a car-truck, two wheel-supporting frames consisting each of arch $a^4$ and tie-bars $a^5$, joined together and provided at their opposite ends with journal-boxes $a^3$, substantially as described.

5. In a car-truck, a wheel-supporting frame consisting of arch $a^4$ and tie-bars $a^5$ and a cross brace or bar, $a^7$, combined with a spindle, $c'$, extended into the bar $a^7$, and provided at its lower end with a friction or bearing roller, substantially as described.

6. In a car-truck, a wheel supporting frame consisting of arch $a^4$ and tie-bars $a^5$ and a cross brace or bar, $a^7$, combined with a spindle, $c'$, extended into the bar $a^7$ and provided at its lower end with a roller, $c^7$, having an inclined or beveled periphery, substantially as described.

7. In a car-truck, two wheel-supporting frames, each composed of arch and tie and cross bars cast integral, combined with a bolster uniting said frames, substantially as described.

In testimony whereof I have signed my name to this specification in the presence of two subscribing witnesses.

LOUIS GODDU.

Witnesses:
JAS. H. CHURCHILL,
F. L. EMERY.